United States Patent [19]
Berry, III et al.

[11] Patent Number: 5,774,056
[45] Date of Patent: Jun. 30, 1998

[54] GAUGE FOR MONITORING AIR FILTERS

[75] Inventors: Charles Henry Berry, III, Cedar Falls; Jerry Lee Manross, Waverly; Thomas Alan Stoll, Waterloo; Gregory Matthew Ferris, Cedar Falls; James Nathan Forry, Waterloo, all of Iowa

[73] Assignee: Engineered Products Co., Waterloo, Iowa

[21] Appl. No.: 655,396

[22] Filed: May 30, 1996

[51] Int. Cl.[6] .................................................. G08B 21/00
[52] U.S. Cl. ......................... 340/607; 340/626; 116/268; 73/721; 73/746
[58] Field of Search .................................. 340/607, 626; 73/709, 721, 746; 210/90; 116/268, 283, 276, 294

[56] References Cited

U.S. PATENT DOCUMENTS

| | | | |
|---|---|---|---|
| 2,946,222 | 7/1960 | Hujsak | 73/746 |
| 3,594,745 | 7/1971 | Nickels | 340/626 |
| 3,654,414 | 4/1972 | Kudlaty | 116/268 |
| 3,696,666 | 10/1972 | Johnson et al. | 340/607 |
| 3,939,457 | 2/1976 | Nelson | 340/607 |
| 4,033,733 | 7/1977 | Nelson | 55/274 |
| 4,171,962 | 10/1979 | Kippel et al. | 55/274 |
| 4,183,029 | 1/1980 | Isayama et al. | 340/607 |
| 4,279,162 | 7/1981 | Neill et al. | 73/746 |
| 4,369,728 | 1/1983 | Nelson | 116/276 |
| 4,423,751 | 1/1984 | Roettgen | 340/607 |
| 4,445,456 | 5/1984 | Nelson | 116/268 |
| 4,937,557 | 6/1990 | Tucci et al. | 340/607 |
| 5,092,177 | 3/1992 | Varacca | 73/721 |
| 5,239,861 | 8/1993 | Fujita et al. | 340/607 |
| 5,315,875 | 5/1994 | Benedikt et al. | 73/721 |
| 5,477,731 | 12/1995 | Mouton | 340/607 |

*Primary Examiner*—Jeffery Hofsass
*Assistant Examiner*—John Tweel, Jr.
*Attorney, Agent, or Firm*—McAndrews, Held & Malloy, Ltd.

[57] ABSTRACT

An indicating device includes a housing that is separated into two sub-chambers by a flexible diaphragm. A indicating member is carried by the diaphragm so that the diaphragm and the indicating member move, within the housing, responsively to changes in the pressure of the air flowing through an air intake system caused by restrictions in or clogging of the air intake filter. The indicating device incorporates an electromechanical sensor for monitoring the position of the diaphragm and producing an output signal responsive thereto. In one embodiment, the sensor is a potentiometer which produces an output signal which varies continuously between a first value when the diaphragm is at its unrestricted position and a second value when the diaphragm is at its restricted position. In a second embodiment, the sensor includes a switching circuit which produces a switched output signal which varies between at least three states corresponding to three different diaphragm positions.

12 Claims, 4 Drawing Sheets

GAUGE FOR MONITORING AIR FILTERS

FIELD OF THE INVENTION

The present invention relates to an improvement for an air filter restriction indicating device for use in connection with internal combustion engine intake air filtration systems and/or heating/ventilation/air conditioning (HVAC) systems. Specifically, the improvement relates to the incorporation of an electromechanical sensor into a filter monitoring device for providing an electrical output indicative of filter restriction.

BACKGROUND OF THE INVENTION

Automotive and air filter manufacturers are interested in low cost mechanisms for detecting air filter plugging to warn the vehicle user that the filter needs to be changed. Such devices have application for monitoring the intake air filter, as well as micron air filters which are now being used in some vehicle HVAC systems. Low cost, reliable air filter restriction indicating devices are disclosed in U.S. Pat. Nos. 4,445,456; 4,369,728; 4,033,733; and 3,939,457, the disclosures of which are hereby incorporated by reference. Similarly, my co-pending application Ser. No. 08/393,878, describes a low cost filter monitoring device for use in HVAC micron filtration systems, the disclosure of which is also hereby incorporated by reference.

The increased use of vehicle electronics make it desirable to provide a sensor which produces an electrical output signal indicative of filter clogging level. The ability to predict preventive maintenance through such electronic monitoring can prevent costly vehicle downtime and over-servicing of the vehicle. My copending application Ser. No. 08/393,878, describes an embodiment of an HVAC filter monitoring device which provides electrical output signal which changes states when the filter is fully clogged. Similarly, U.S. Pat. No. 4,033,733 includes an electrical circuit which activates an indicator light when the filter becomes clogged. These devices are rather crude, however, and do not lend themselves to ready manufacture or easy use in the field. Moreover, neither of these devices provides an indication of the relative clogging level of the filter. Rather, they only indicate whether the filter is unrestricted or fully clogged.

SUMMARY OF THE INVENTION

It is therefore an object of the present invention to provide an accurate and reliable air filter restriction indicating device which produces an electrical output signal indicative of filter clogging level.

Still another object of the present invention is to provide an air filter restriction indicating device which may be used to monitor either vacuum pressure or differential pressure.

Yet another object of the present invention is to provide an electromechanical sensing circuit which can be incorporated into the filters described in the aforementioned patents without any substantial modification of the monitoring device.

A further object of the present invention is to provide an air filter restriction device of the type described which has a low cost, a high reliability, and a high durability housing.

These and other objects, benefits and advantages are achieved by an improved air filter restriction indicating device comprising a housing having a first end, a second end, and a side wall defining a generally cylindrical overall chamber in the housing. A flexible diaphragm is disposed within the housing. The diaphragm has a central portion and has an edge portion secured to the housing. The diaphragm divides the overall chamber into a first sub-chamber, adjacent to the first end of the housing, and a second sub-chamber, adjacent to the second end of the housing. The central portion of the diaphragm is movable between an unrestricted position wherein the diaphragm is more closely adjacent to the second end of the housing and a restricted position wherein the diaphragm is more closely adjacent to the first end of the housing. A first passage through the housing permits air communication between the air flowing out of the air filter and the first sub-chamber in the housing, and a second passage vents the second sub-chamber to the atmosphere. A coil compression spring is disposed in the first sub-chamber and is compressed between the first end of the housing and the diaphragm. The compression spring has a compression force sufficient to balance the differential pressures between the first and second sub-chambers so that the diaphragm will be positioned at its unrestricted position when the air filter is unrestricted, and so that the diaphragm will be moved from the unrestricted position progressively toward the extended position in response to increases in the restriction of air filter. A sensor means is provided for sensing the relative position of the diaphragm and responsively producing an electrical output signal having at least three states, each signal state corresponding to a different position of the diaphragm. An output terminal is connected to the sensor means and is adapted to deliver the output signal to an external device.

In one embodiment the sensor means comprises a potentiometer which produces an output signal which varies continuously between a first value when the diaphragm is at its unrestricted position and a second value when the diaphragm is at its restricted position. The potentiometer comprises a strip of resistive material connected between first and second electrical potentials, a conductive strip aligned adjacent the resistive strip, and a wiper member connected for movement with the diaphragm member and forming a short circuit between the resistive strip and the conductive strip.

In a second embodiment, the sensor means comprises a switching circuit which produces a switched output signal which varies between at least three states. The switching circuit comprises at least a pair of two position switches which are secured to the housing second end, and an activation means for selectively moving the switches between their two positions states as the diaphragm member moves through its range of travel.

DETAILED DESCRIPTION OF THE PREFERRED EMBODIMENTS

Figures 1, 2, 5:
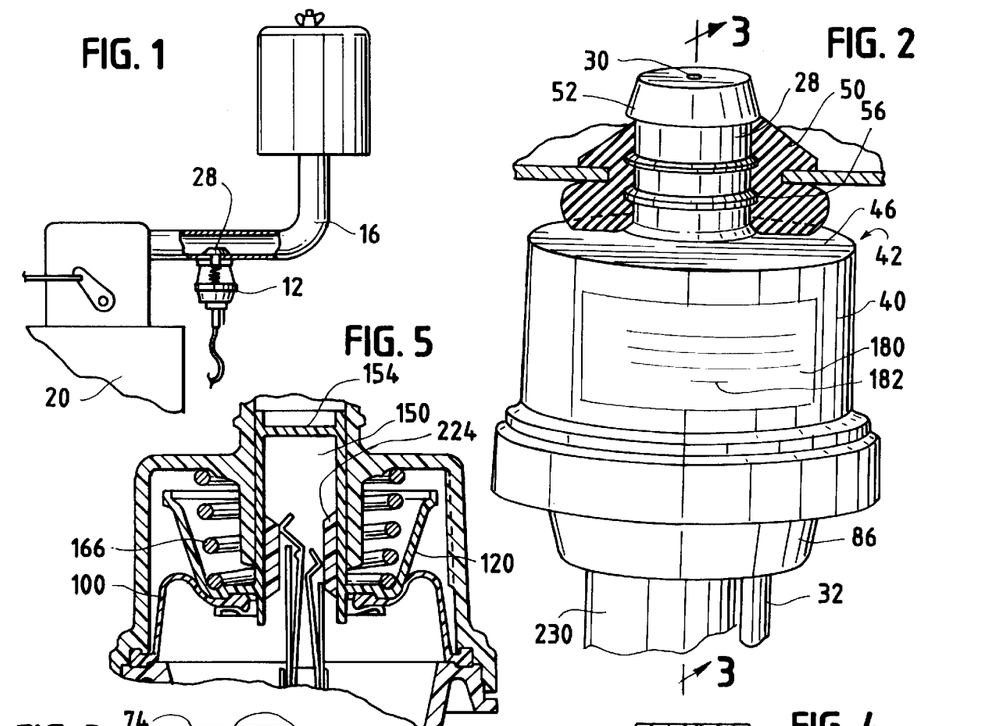
FIG. 1 is schematic view of a vehicle air intake system with the indicating device of the present invention connected in a vacuum pressure monitoring position.
FIG. 2 is a perspective view of the indicating device.
FIG. 5 is a cross-sectional view similar to FIG. 3 with the indicating device being shown in its fully restricted position.
Figure 18:
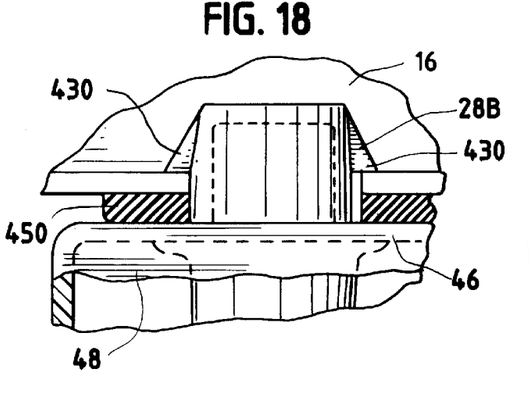
FIG. 18 is a partial section view illustrating a first alternative mounting bracket for the indicating device.
Figure 19:
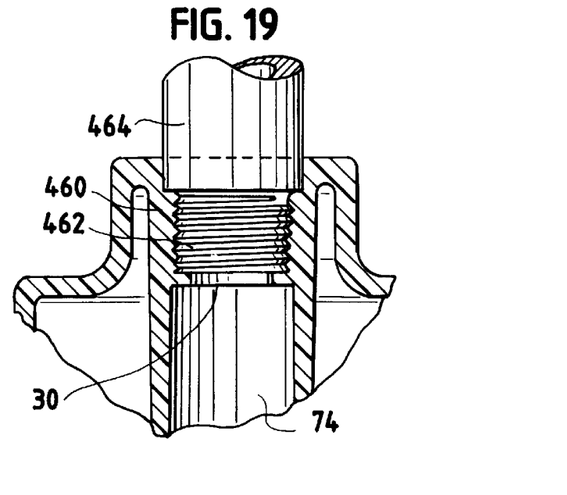
FIG. 19 is a partial section view illustrating a second alternative mounting bracket for the indicating device.

Referring now to the drawings, FIG. 1 is schematic view of an air intake system with an air filter restriction indicating device 12 of the present invention connected in a negative (vacuum) pressure monitoring position. The indicating device 12 is secured to the air line 16 extending from the air filter 18 to the air intake of an internal combustion engine 20 by an integrally formed mounting bracket 28 which extends through an aperture in the air line 16. Alternative mounting brackets are illustrated in FIGS. 18 and 19 and are more fully explained below.

When the indicating device 12 is used in a negative pressure monitoring position, such as shown in FIG. 1, it is connected to the air line 16 at a location between the air filter 16 and the engine air intake. The mounting bracket 28 includes and defines a negative pressure or vacuum port 30 (see FIG. 2) which is in communication with the filtered air flowing through the air line 16. Air flowing through the line 16, and thus through the vacuum port 30, is under negative pressure or "vacuum" condition when the engine 20 is operating. This vacuum condition increases, i.e., the air pressure in the line 16 is reduced, as the filter element (not shown) in the air filter 18 becomes increasing dirty and ultimately clogged. As is explained in greater detail below, the indicating device 12 monitors the vacuum pressure and responsively produces an electrical output signal which is indicative of how clogged or restricted the filter 18 has become. The device 12 may also be constructed to visually indicate the filter's level of restriction.

The indicating device 12 can also be connected in a differential pressure monitoring position to measure the pressure drop across an air filter 18. For this purpose, the indicating device 12 also includes a positive pressure port 32 (See FIG. 2) which can be connected by an air line to a position upstream of the air filter 18 to monitor the pressure at the inlet side of the filter. (When the indicating device 12 is connected to monitor vacuum pressure, as in FIG. 1, the positive pressure port 32 is vented to the atmosphere.) In the differential pressure mode, the vacuum port 30 in turn is connected to the line 16, downstream from the filter 26 as described above. This differential mode is generally used when the filter is employed to monitor low pressures, such as those present in a vehicle HVAC system.

Except as hereinafter noted, the structure of the indicating device 12 is similar to that described in the aforementioned patents and my pending application. In summary, however, the indicating device 12 includes a substantially cylindrical housing 42. (See additionally FIG. 2). The mounting bracket 28 projects upwardly from the center of the upper end wall 46 of the housing 42. The mounting bracket 28 is generally tubular and is sized to receive an elastomeric, e.g. rubber, mounting grommet 50 about its outer diameter. The grommet 50 forms an air tight seal between the mounting bracket 28 and the air line 16, and it also reduces the level of mechanical shock imparted on the indicating device 12. The grommet is secured on the mounting bracket 28 by an increased diameter flange 52 formed at the top of the mounting bracket 28 and a plurality of raised rings or ribs 56 formed in the outer diameter of the mounting bracket 28. The flange 52 has beveled outer surface which eases insertion of the grommet 50 over the flange and onto the mounting bracket 28.

Figure 3:
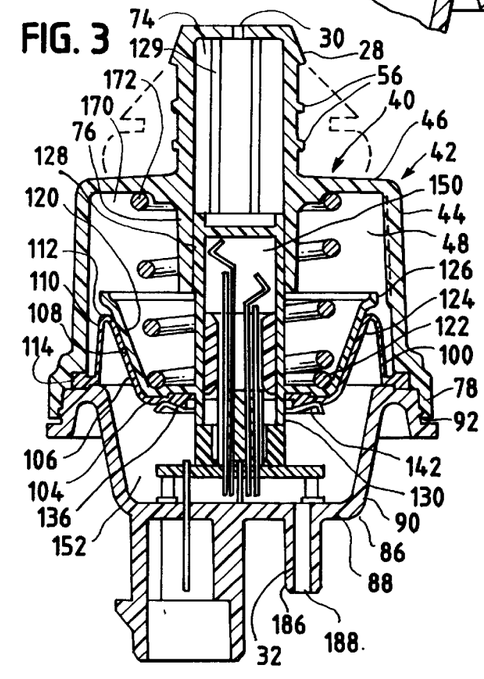
FIG. 3 is a central, vertical cross-sectional view of a first embodiment the indicating device which utilizes a switching circuit to produce an output signal indicative of filter clogging, wherein the indicating device is shown in its fully unrestricted position.
Figure 4:
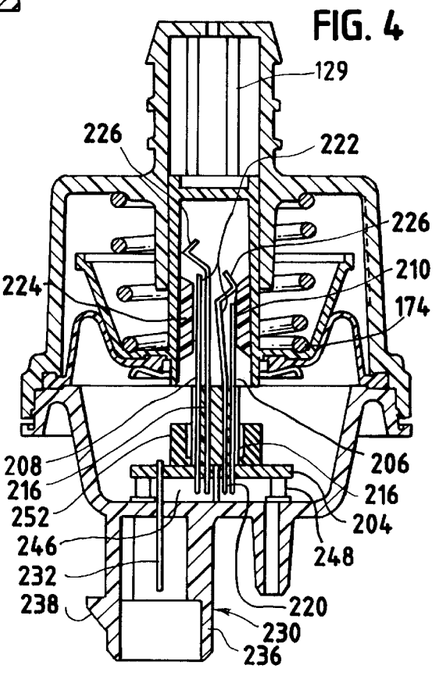
FIG. 4 is a cross-sectional view similar to FIG. 3 with the indicating device being shown in its intermediate, partially restricted position.

Referring additionally to FIGS. 3–5, the housing 42 includes an upper portion 40 consisting of the upper end wall 46 and an integrally formed, annular side wall 44. The walls 44, 46 are of a generally uniform thickness and define a internal chamber 48. The housing 42 is preferably molded from a plastic material, such as a polycarbonate. A suitable material is LEXAN grade 103R112 polycarbonate as is available from G.E Plastics.

The mounting bracket 28 has a central passage or bore 74 for permitting air communication between the line 16 and the housing internal chamber 48. The bore 74 is further defined by an annular neck 76 which extends downwardly from the end wall 46 and into the internal chamber 48. The top of the bore 74 has a reduced diameter opening which defines port 30.

The lower end of the side wall 44 includes an annular, radially outward offset 78. The offset is sized to receive a base cap 86 which serves to further define the internal chamber 48. The base cap 86 is preferably molded from a material such as polycarbonate. A suitable material is the LEXAN grade polycarbonate described above. The base cap 86 is generally cup-shaped and includes a bottom wall 88 and a side wall 90 which terminates in a downwardly extending outer annular flange 92. The flange 92 has a radially outer facing surface which conforms and fits snugly within the radially inner facing surface of the offset 78. The base cap 86 is preferably secured to the housing via sonic welding; however, other conventional means, such as a snap ring or adhesives, may also be used to secure the base cap to the housing.

A diaphragm 100, formed of a pliable material, such as silicone, is disposed within the housing. The diaphragm 100 is generally cup-shaped and consists of a central portion 104 and an integral side wall 106. The side wall 106 has a generally U-shaped cross section and consists of inner and outer portions 108, 110 connected by a convex upper portion 112. The outer distal edge of the portion 110 terminates in an annular bead seal 114 which is compressed and held between the housing upper portion 40 and the base cap 86. This fixes the relative position of the bead seal 114, and hence the edge of the side wall outer portion 110, within the inner chamber 48. The bead seal 114 prevents air from passing between the side wall 42 and the base cap 86.

An upright, generally cup-shaped indicating member 120, formed of rigid molded plastic, is seated upon (and either adhesively or mechanically secured to) the central portion 104 of the diaphragm 100. The indicating member 120 has a bottom wall 122 overlying the central portion 104 of diaphragm 100 and an integral, upwardly extending annular side wall 124 that terminates in a radially outwardly extending indicator rim 126. The outer edge of the rim 126 may be brightly colored and may serve as a readily visible indicator such that its vertical position within the chamber 48 indicates the amount of restriction or extent of contamination of the filter element in the air filter 18.

The indicating member 120 also includes an integrally formed, centrally disposed, tubular guide post 128. The guide post 128 extends upwardly from the bottom wall 122 and into the bore 74. Preferably, there are a plurality of longitudinal protrusions 129 formed on the interior of the bore 74. The protrusions 129 form a free sliding fit with the guide post 128 so that the guide post 128 may freely slide within that bore 74 without tilt or drag. The space between the protrusions 129 defines air passages which permit air to flow between the guide post and the walls of the bore 74. The guide post 128 includes an integral lower portion 130 which extends downwardly from the bottom wall 122 and through a central opening in the center of the diaphragm 100. The diaphragm central opening is defined by an integrally formed bead seal 136 which fits around the outer diameter of the guide post lower portion 130 and seats in a recess formed at the junction of the bottom wall 122 and the guide post lower portion 130. The diaphragm 100 is secured to the indicating member 120 by a fastener 142, such as a speed nut, which is secured on the lower portion 130 of the guide post 128. However, other means, such as adhesives and/or other mechanical fasteners may also be employed to connect the diaphragm 100 to the indicating member 120.

The guide post 128 has a central coaxial bore 150 that opens into the lower portion 152 of the chamber 48, i.e. the portion of the chamber 48 below the diaphragm 100. The upper portion of the guide post 128, i.e. the portion of above the bottom wall 122, has a length so that it cannot be fully withdrawn from within bore 74 when the diaphragm 100 is at its lowermost (unrestricted filter) position. The upper end of the bore is sealed by an integrally formed upper wall which prevents air from passing into or out of the lower portion 152 of the chamber 48 via the bore 150. It should be appreciated that a separately formed end cap could also be used to seal the guide post bore.

A coil compression spring 166 is disposed within the upper portion 170 of the chamber 48, i.e. the portion above the diaphragm 100. The spring 166 is mounted coaxially about the guide post 128 and the neck 76. The spring 166 has an upper end 172 that bears against the inner, lower side of the end wall 46 and a lower end 174 that bears against the upper surface of the bottom wall 122 of the indicating member 120.

The spring 166 normally biases the diaphragm 100 and indicating member 120 toward their lowermost (or unrestricted filter) position as illustrated in FIG. 3. The spring 166 is compressible to permit the diaphragm 100 and the member 120 to move towards their uppermost (or restricted filter) position, as illustrated in FIG. 5 in response to vacuum pressure in the upper portion 170 of chamber 48 and/or positive differential pressure in the lower portion 152 of chamber 48 vis-a-vis the pressure in the portion 170 of the chamber.

Because the bore 74 extends above the housing end wall 46 and into the mounting bracket 28, the height of the housing 42 (and particularly the portion extending outside of the air line 16) may be made relatively small while still permitting a more than satisfactory length or degree of linear travel by the indicating member 120. As a result, the space required for mounting the indicating device 12 is reduced.

As noted above, the upper portion 170 of the chamber 48 is sealed from the exterior atmosphere and is in direct communication with the air in the air line 16. Thus contaminants in the atmosphere surrounding the device 12 do not affect the operation of either the indicating member 120 or the spring 166. The diaphragm is tightly sealed at and by its outer and inner bead seals 114, 136, as was detailed above. These bead seals 114, 136 prevent any air communication between lower and upper portions 152 and 170 of the chamber 48.

As best illustrated in FIG. 2, the side wall 44 of the housing 42 may include a transparent portion or window 180. A plurality of vertically spaced, horizontal lines or bands 182 may be placed across the transparent portion 180 and may serve as a visual indication, together with the indicator rim 126 of the indicating member 120, of the restriction level or degree of restriction of the filter element in air filter 18. For example, when the rim 126 reaches the uppermost band 182, this may be used to signify that the filter element is fully restricted and requires cleaning or replacement. The particular indicia lines, however, shown in the drawings are merely for illustration.

The positive pressure port 32 is defined by an annular projection 186 extending downwardly from the bottom wall 88 of the base cap 86. The projection 186 includes a central passage 188 that is open to the atmosphere at its lower end and open to the lower portion 152 of the internal chamber 48 at its upper end. A conventional filter medium (not shown) may be positioned in the central passage 188. This filter medium prevents the entry of dirt or dust particles into the lower portion 152 of the chamber 48 via the port 32.

It will be understood that the construction of the indicating device 12 as thus far described is similar to the indicating devices described in the aforementioned patents. Moreover, it is to be understood that the components thus far described may assume other configurations without departing from the scope of the present invention. For example, the indicating device described above is particularly suited for monitoring the restriction level of an intake filter for an internal combustion engine. In order to be suited for monitoring the low pressures present in an HVAC micron filtration system certain components, e.g. the diaphragm and base cap, should be configured as described and shown in my co-pending application Ser. No. 08/393,878.

The improvement of the present invention resides in the incorporating an electromechanical sensor into the device 12 for producing an output signal indicative of the level of filter restriction. In this respect, most of the aforementioned patents (and my pending application) incorporate a lock-up mechanism which progressively locks the indicating member into various indicating positions as the filter becomes clogged. In these prior designs, the lock-up means includes an elongated locking member extending into the guide post bore 150. In the present invention an electromechanical sensor has been substituted for the lock-up means. As was mentioned above, however, the indicating device may still incorporate a window 10 in the side wall so that the restriction level can be visually checked during engine operation.

Figure 6:
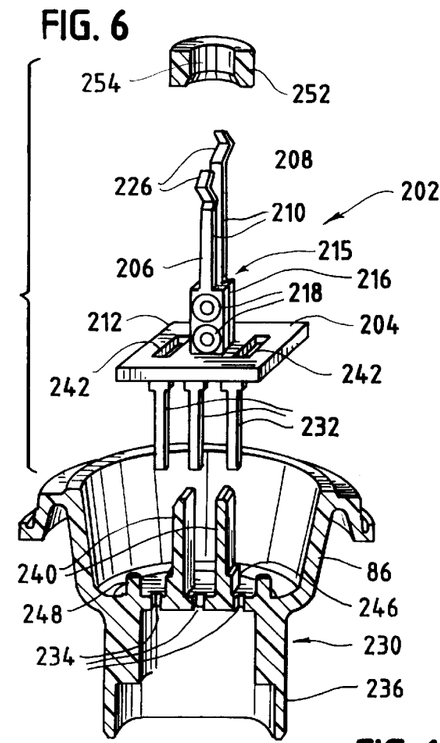
FIG. 6 is a partial exploded cross-sectional view illustrating the switching circuit employed in the embodiment of FIGS. 3–5.
Figure 7:
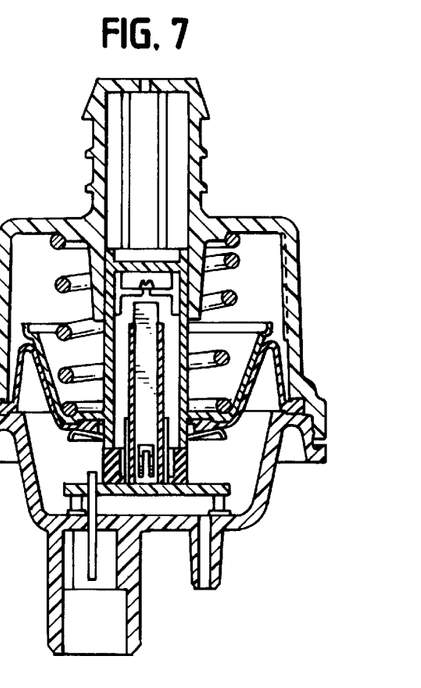
FIG. 7 is a central, vertical cross-sectional view of a second embodiment of the indicating device which employs a variable resistance circuit to produce an output signal indicative of filter restriction, wherein the indicating device is shown in its fully unrestricted position.

Referring additionally to FIG. 6, a first embodiment of the sensor includes switching circuit 202 which is carried by a support member 204 (preferably in the form of a printed circuit board) which is mounted in the base cap. The switch subassembly 202 includes first and second two-position switches 206, 208, each of which includes a pair of elongated metal flex arms 210. The flex arms 210 are formed of thin metallic strips having an increased width lower ends 212. The lower ends 212 of the flex arms are separated by layers of insulation 216 and are secured together by a pair of rivets 218 to form an integral switch subassembly 215. Terminals 220 formed at the lower ends of each flex arm extend through reciprocal apertures (not shown) in the printed circuit board 204 to secure the subassembly 215 to the printed circuit board. Solder (not shown) may be used to further secure the terminals 220 to the circuit board 204 and to electrically interconnect the switch subassembly 215 to the circuit board.

The flex arms 210 extend upwardly from the circuit board 204 and into the guide post bore 150. The upper ends of the flex arms 210 carry contacts 222 which are normally biased to a closed position (see FIG. 3) and are movable to an open position (see e.g. FIG. 5) by an activation member 224 which is carried on the interior of the guide post bore 150. The contacts 222 are preferably plated with a non-corrosive material such as gold or platinum. Although such materials are relatively soft, wear is not a concern because of the infrequency with which the contacts 222 are activated. The activation member 224 is in the form of a reduced diameter insert which is secured in the interior of the central bore 150. The upper end of one flex arm 210 in each switch 206, 208 includes an outwardly bent portion 226 which is positioned to engaged with the activation member 224 at a preselected point as the indicating member 120 moves between its upper and lower positions.

The upper ends (i.e. the outwardly bent portions 226) of the flex arms 210 in the first and second switches 206, 208 terminate at different heights such that the switches 206, 208 are activated at different points in the indicating member's range of travel. Specifically, when the indicating member 120 is at its lower, unrestricted position, both switches 206, 208 are in their closed position (See FIG. 3). As the filter 18 becomes clogged, the diaphragm 100, and hence the indicating member 120, are drawn upwardly into the chamber 48. As the diaphragm 110 and indicating member 120 move upwardly, the activation member 224 initially engages the outwardly bent portion 226 of the first switch 206, moving the first switch to its open position (See FIG. 4). As the filter becomes more clogged, the diaphragm 100 and indicating member 120 continue to be drawn upwardly into the chamber 48 until they eventually reach the upper or fully restricted position. At that point, the activation member 224 engages the outwardly bent portion 226 of the second switch 208, moving it to its open position (See FIG. 5). Because the switch contacts 222 are closed most of the time, a sensor check can be performed at key-on engine start-up. As will be appreciated, additional switches could be provided to give the sensor greater resolution. Additionally, the activation member 224 could be positioned to cause the first switch 206 to return to its closed position when the indicating member 120 reaches its fully extended position, thereby giving four switching states (i.e. both open, S1 open and S2 closed, both closed, S1 closed and S2 open).

The activation member 224 is preferably press fit into the bore 150 during assembly. Hence, the sensor's output can be adjusted (calibrated) during assembly by adjusting the distance the activation member 224 is inserted into the bore 150. Once the proper distance is determined, it can be repeatedly achieved in the manufacturing process by using a tool stop.

The indicating device 12 includes an integrally formed three terminal weather proof output connector 230 which is adapted to mate with a female connector (not shown) from an external electrical device (such as a vehicle computer). The output connector 230 includes three output terminals 232 which extend downwardly from the bottom of the printed circuit board 204 and out through reciprocal apertures 234 formed in the base cap. The apertures 234 are undersized in comparison to the terminals 232 to form an interference fit around the terminals when the circuit board 204 is inserted into the base cap. Alternatively, the terminals 232 could be insert molded into the base cap 86 when the base cap is formed and thereafter the terminals could be secured to the circuit board 204 in the manner described above. An integrally molded connector wall 236 extends from the base cap about the output terminals 232. The connector wall 236 is appropriately configured to mate with the female connector from the external circuit. Preferably the output connector is configured to mate with a model number 12110293 three terminal weather seal connector as is sold by Packard Electric Company of Warren, Ohio. The connector wall 236 includes a locking tab 238 which is positioned to mate with a reciprocal aperture on the female connector to releasably secure the female connector to the output terminal.

Figure 11:
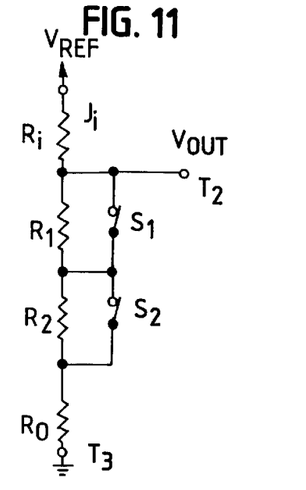
FIGS. 11 through 13 are electrical schematics illustrating alternative circuit configurations for the switching circuit of the first embodiment of the indicating device.

The output terminals 232 are electrically interconnected with the switches 206, 208 for delivering an output signal indicative of the positions of the switches 206, 208, and hence of the relative level of filter restriction. For this purpose, the circuit board 204 may carry a resistor circuit such as those shown in FIGS. 11 and 12, where $T_1$, $T_2$, and $T_3$ represent the output terminals 232 and $S_1$ and $S_2$ represent the first and second switches 206, 208. The circuit of FIG. 11 is a three wire active circuit. Typical output valves for this circuit are as follows:

| Position of Indicator Member | Vout |
|---|---|
| ● Below to First Switch Point (Unrestricted) | $0.2 \times V_{REF}$ |
| ● First Switch Point to Second Switch Point (Partially Restricted) | $0.5 \times v_{REF}$ |
| ● Above Second Switch Point (Fully Restricted) | $0.8 \times V_{REF}$ |

Figures 12, 13, 15A:
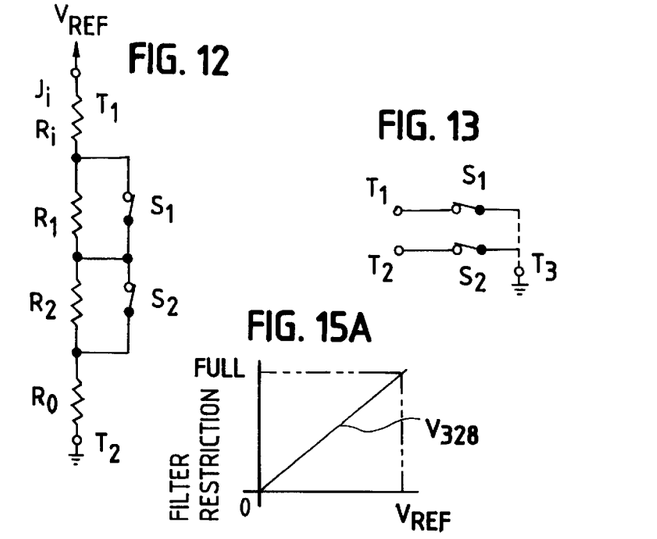
FIGS. 15A and 15B are graphs of applied filter restriction level versus output voltage for the circuit of FIG. 14.

The circuit of FIG. 12 is a two wire rheostat circuit—Typical output valves for this circuit are as follows:

| Position of Indicator Member | Measured Resistance |
|---|---|
| ● Below to First Switch Point (Unrestricted) | $R_i + R_0$ |
| ● First Switch Point to Second Switch Point (Partially Restricted) | $R_i + R_0 + R_1$ |

-continued

| Position of Indicator Member | Measured Resistance |
| --- | --- |
| ● Above Second Switch Point (Fully Restricted) | $R_i + R_0 + R_1 + R_2$ |

As will be appreciated, the illustrated circuits are exemplary only. The resistive valves may be varied and/or other circuits may be used to meet a wide variety of signal requirements. For example, FIG. 13 represents an alternative three wire switched circuit which may also be employed in some applications.

As was mentioned above, the circuit board 204 is carried by the base cap 86. For this purpose, a pair of mounting brackets 240 extend upwardly from the inner surface of the base cap (See FIG. 6). The circuit board 204 includes a pair of reciprocal mounting apertures 242 to permit the circuit board to slide onto the mounting brackets 240 during assembly. The lower portions 246 of the mounting brackets are larger than the mounting apertures 242 so as to vertically support the printed circuit board 204 from below. Additional support members 248 may be formed in the interior of the base cap 86.

When the printed circuit board 204 is positioned on the mounting brackets 240, the upper ends of the brackets 240 extend up through the printed circuit board 202 on opposite sides of the lower end of the switch subassembly 215. The inner surfaces of the mounting brackets 240 are separated by a distance which is slightly greater than the width of the switch subassembly 215. A collar 252 is sized to slide around the mounting brackets 240 to fixedly secure the circuit board 204 to the base cap 86. The inner diameter of the collar 252 is sized to form a friction fit with the outer surfaces of the mounting brackets 240. The lower edge of the collar's inner bore 254 and the upper ends of the mounting brackets 240 may be beveled to facilitate placement of the collar over the mounting brackets during assembly.

The collar 252 is a multifunctional part which serves to hold the circuit board 204 in place, keep the switch subassembly 215 in the correct position, and to function as the bottom stop for the diaphragm 100. In some applications the collar 252 can be used to position a bottom stop for the diaphragm near the actuation point of the first switch 206 to eliminate excessive cycling of the diaphragm.

Referring now to FIGS. 7–10, a second embodiment of the electromechanical sensor will be described. In this embodiment, the sensor is in the form of a potentiometer 300 which produces an output signal which varies linearly between a first value and a second value in accordance with the relative position of the diaphragm 100 within the housing 42. The potentiometer 300 includes a molded plastic housing 302 which is mounted on top of the printed circuit board 202 and which extends upwardly into the guide post central bore 150. The mounting brackets 240 extend through the openings 242 in the circuit board on opposite sides of the housing 302, and the collar 252 slides over the mounting brackets to secure the circuit board 202 to the bottom cap 86 in the manner described above in connection with the first embodiment.

Figures 8, 9, 10:
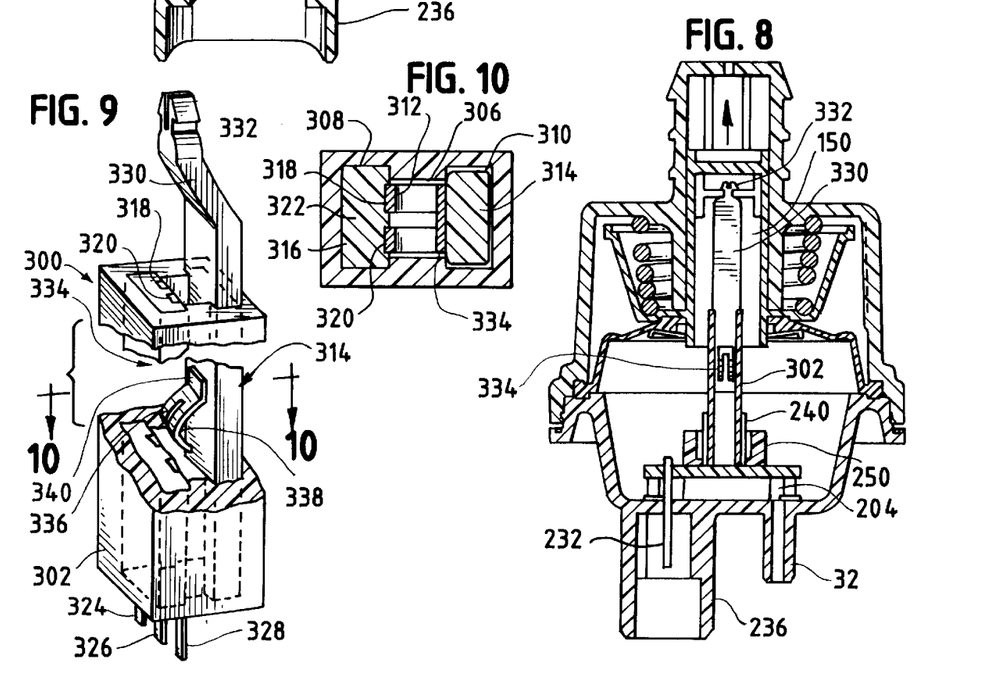
FIG. 8 is a cross-sectional view similar to FIG. 7 with the indicating device being shown in its fully restricted position.
FIG. 9 is a fragmented perspective view of a variable resistance subassembly employed in the embodiment of FIGS. 7 and 8.
FIG. 10 is a cross-sectional view along line 10—10 of FIG. 9.

The housing 302 defines an H-shaped central passage 306 having a first slot 308, a second slot 310 running parallel to the first slot 308, and a connecting slot 312 extending between the first and second slots 308, 310. A wiper assembly 314 is slidably mounted in one of the first and second slots 308, 310 and a stationary portion 316 is mounted in the other slot. The stationary portion 316 includes a resistive strip 318 and a conductive strip 320 which are disposed on the inner face of a support plate 322 (which is preferably in the form of a printed circuit board). The support plate 322 is sized to slide into the top end of the slot 308 during assembly and is held in place by adhesives, friction fit or other suitable means. Preferably the strips 318, 320 are screen printed on the support plate 322; however, it is foreseeable that the strips could be disposed on the support plate by methods such as etching, insert molding, compression molding, etc.

The bottom end of the resistive strip 318 is electrically connected to a first contact terminal 324 and the top end of the resistive strip is electrically connected to a second contact terminal 326. The first and second contact terminals 324, 326 both extend from the bottom edge of the support plate 322. Similarly, the conductive strip 320 is electrically connected to a third contact terminal 328 which also extends from the bottom edge of the support plate 322. The terminals 324–328 are positioned to align with and extend through reciprocal openings (not shown) in the printed circuit board 204 to secure and electrically connect the potentiometer 300 with the circuit board. Solder (not shown) may also be used to further secure the potentiometer to the circuit board.

The wiper assembly 314 includes a plate like slider member 330 which is slidably mounted in the other slot 310 of the H-shaped passage 306. The top of the slider member 330 terminates in a connection bracket 332 which is adapted to be inserted into a reciprocal opening in the indicating member 120 to connect the slider to the indicating member for movement therewith. A metallic wiper 334 is fixedly secured to the bottom end of the slider member 330, e.g. by a rivet, adhesive, or molding process. The wiper 334 has two outwardly extending legs 336, 338, each of which contacts a different one of the strips 318, 320, and a connecting portion 340 extending between the legs 336, 338. The wiper 334 is of negligible resistance and effectively forms a short circuit from the resistive strip 318 to the conductive strip 320.

Figure 14:
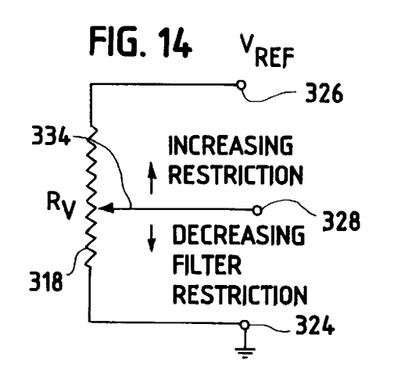
FIG. 14 is a schematic illustration of a first circuit for implementing the variable resistance circuit of the second embodiment of the indicating device.
Figure 15B:
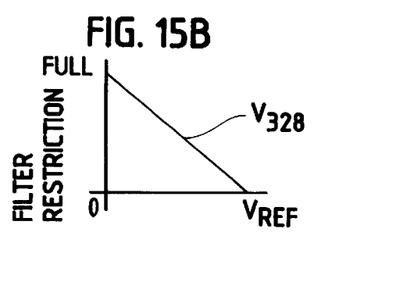

FIG. 14 is a schematic illustration of a first embodiment of an electrical circuit for implementing the potentiometer 300. As can be seen, the resistive strip 318 is connected between a first voltage potential $V_{ref}$ and a second voltage potential (e.g., ground). Thus, the entire conductive strip 320 is maintained at a DC voltage potential correlative to the position of the movable wiper 334 on the resistive strip 318. The level of filter clogging is sensed by measuring the voltage potential ($V_{328}$) at the wiper terminal 328. Specifically, as the filter 18 becomes clogged, the diaphragm 100 (and hence the wiper 334) moves upwardly in the internal chamber 48. As the diaphragm 100 moves between the restricted and unrestricted positions, the measured voltage ($V_{328}$) varies linearly between a minimum value and a maximum value ($V_{ref}$) as is shown in FIG. 15A. It will be appreciated that an inversely proportional output signal would be produced (See FIG. 15B) if the first voltage potential were lower than the second potential. The potentiometer could also be replaced, for example, by a variable capacitance or inductance device. Moreover, the printed circuit board 204 may carry a conditioning circuit, such as a circuit adapted produce a pulse-width modulated signal.

Figure 16:
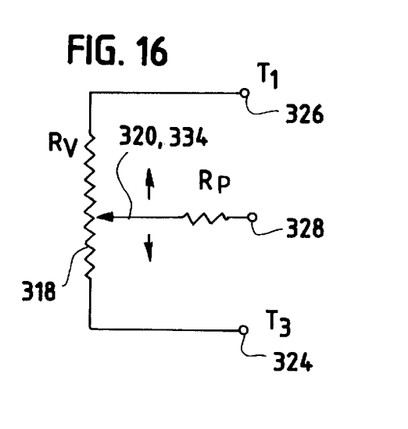
FIG. 16 is a schematic illustration of a second circuit for implementing the variable resistance circuit of the second embodiment of the indicating device.
Figure 17A:
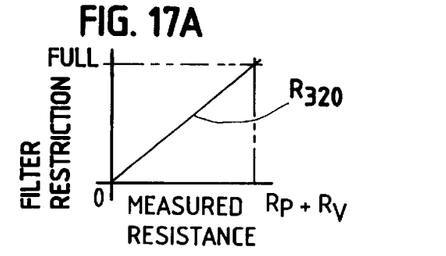
FIGS. 17A and 17B are graphs of filter restriction level versus measured resistance for the circuit of FIG. 16.
Figure 17B:
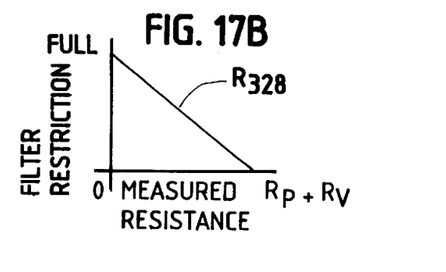

FIG. 16 is a schematic illustration of a second embodiment of an electrical circuit for implementing the potentiometer 300. In this embodiment, the resistance at the wiper terminal 328 is sensed. This resistive value varies linearly between a minimum ($R_p$) and a maximum ($R_p+R_v$) as the diaphragm 100 moves between its unrestricted and restricted positions (see FIG. 17A). FIG. 17B illustrates the output signal when the circuit is connected to produce an output signal which is inversely proportional to filter clogging level.

FIG. 18 illustrates an alternative (bayonet-type) mounting bracket 28B for the indicating device 12. The mounting bracket 28B is generally tubular and has a reduced height vis-a-vis the previously described mounting bracket 28. A pair of diametrically opposed, triangular-shaped flanges 430 extend outwardly from the top of the mounting bracket 28B, and are designed to be received within a similarly shaped and sized mounting aperture formed in the wall of the air duct 16. After the indicating device 12B is inserted into the aperture so that the lower facing surfaces of the flanges 430 clear the air duct wall, the device 12 is then rotated, e.g., a quarter turn, to secure the mounting bracket 28B with the mounting aperture. The lower edges of the flanges 430 may be beveled to draw the housing 42 toward the wall of the air duct 16 when the mounting bracket is rotated in the aperture.

An elastomeric seal 450 is positioned on the end wall 46 around the mounting bracket 28B. The distance between the top of the end wall 46 and the bottom of the flanges 430 is such that the seal 450 is compressed between the air duct wall and the end wall 46 to seal the air duct from the atmosphere.

FIG. 19 illustrates yet another alternative method for the mounting indicating device 12. In this embodiment, the upper wall 46 includes an upwardly extending neck 460 which defines a threaded central bore 462 extending coaxially with the bore 74. The inlet port 30 is defined by a reduced diameter opening between the threaded bore 462 and the bore 74. One end of an air pipe 464 is threaded into the threaded bore 462 and the other end of the pipe is appropriately connected to the air duct 16. The upper end of the bore 462 may include an increased diameter portion for receiving the unthreaded portion of the pipe 464. An air tight seal may be provided by positioning an O-ring (not shown) about the pipe 464 at the junction between its threaded and unthreaded portions. A mounting plate such as the one described in U.S. Pat. No. 4,369,728 may be used to further secure the indicating device 12 in place on the vehicle.

Figure 20:
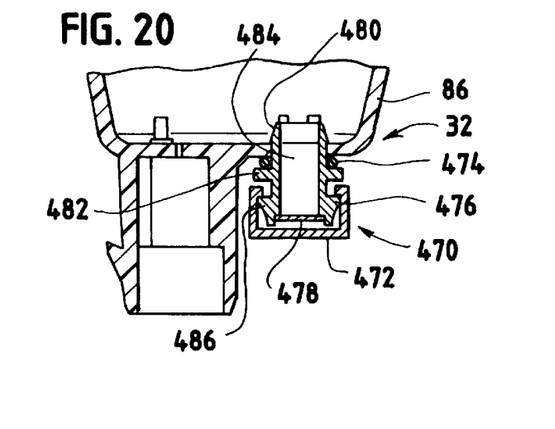
FIG. 20 is partial section view illustrating a first alternative breather port for the indicating device.
Figure 21:
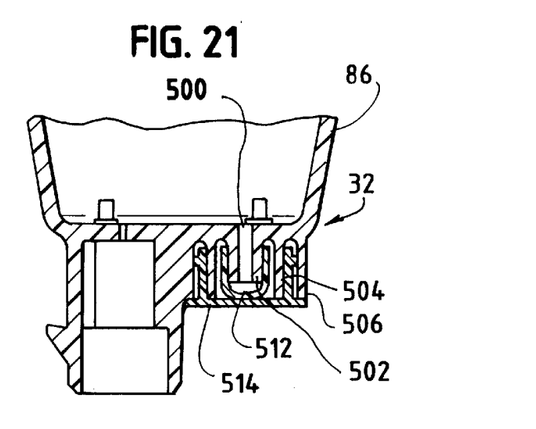
FIG. 21 is partial section view illustrating a second alternative breather port for the indicating device.
Figure 22:
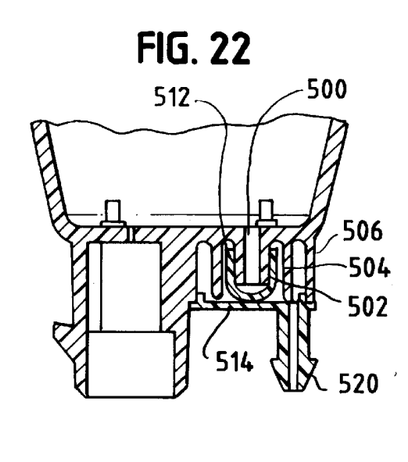
FIG. 22 is partial section view illustrating a third alternative breather port for the indicating device.

FIGS. 20 through 22 illustrate alternative positive pressure/breather ports 32 for the bottom cap 86. In FIG. 20, the port 32 comprises a filter/water shield assembly 470 which is inserted into a reciprocal opening in the bottom cap 86. The filter/water shield assembly 470 comprises a splash shield 472, an O-ring 474, a body portion 476, and a filter element 478. The upper end of the body portion 476 defines a radially extending flange 480 having an outer diameter which is slightly larger than the opening in the base cap 86. The O-ring 474 is positioned on the body portion 476 between the upper flange 480 and a middle flange 482. During assembly, the upper flange 480 is pressed through the opening in the base cap 86 to secure the body portion 476 to the base cap. The outer edge of the upper flange 480 is beveled to ease its insertion through the opening in the base cap 86. The O-ring is compressed between the base cap 86 and the middle flange 482 to form a seal between the body portion 476 and the base cap.

A central bore 484 extends between the upper and lower ends of the body portion 476, and the filter element 478 is secured in the lower end of the central bore 484. The splash shield 472 is in the form of a cap which snaps over a lower radial flange 486 formed on the body portion 476. The outer wall of the splash shield 472 is perforated to permit air to flow into the central bore 484 of the body portion 476 and into the lower chamber 152 of the housing 42.

Figure 23:
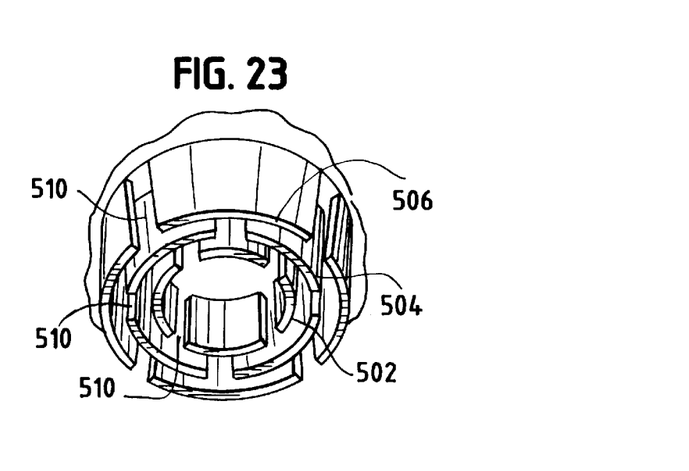
FIG 23 is a partial bottom perspective view of the breather port of FIGS. 21 and 22.

FIG. 21 is an alternative design for the positive pressure port 32. In this embodiment, the port 32 comprises a central opening 500 and three segmented circular walls 502–506 of increasing diameter which extend from the bottom of the base cap 86 concentric to the opening 500. Each of the walls 502–506 includes a series of slots or openings 510, and the slots in the one wall are offset from the slots in the adjacent walls. (See FIG. 23.) This results in a labyrinth construction consisting of a series of walls, ports and slots which permits air flow, but inhibits moisture infiltration into the opening 500. A filter element 512 is positioned about the innermost wall 502 to prevent contaminates from entering central opening 500. An end cap 514 is secured to the bottom of the circular walls 502–506 to prevent water from splashing up through the bottom of the walls and into the central opening 500. The end cap 514 may be constructed of thermoplastic rubber or other suitable material and may be secured to the circular walls 502–506 by sonic welding, for example. FIG. 22 is generally similar to FIG. 21, except that a tubular nipple 520 extends from the bottom of the end cap 514 to allow the indicator 12 to be connected to measure the differential pressure drop across the filter 18.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An improved air filter restriction indicating device comprising:

a housing having a first end, a second end, and a side wall defining a generally cylindrical overall chamber in the housing;

a flexible diaphragm disposed within the housing, with the diaphragm having a central portion and having an edge portion secured to the housing so that the diaphragm divides the overall chamber into a first sub-chamber, adjacent to the first end of the housing, and a second sub-chamber, adjacent to the second end of the housing, and with the central portion of the diaphragm being movable between an unrestricted position wherein the diaphragm is more closely adjacent to the second end of the housing and a restricted position wherein the diaphragm is more closely adjacent to the first end of the housing;

a first passage for permitting air communication between the air flowing out of the air filter and the first sub-chamber in the housing;

a second passage through the housing for venting the second sub-chamber to the atmosphere;

a coil compression spring disposed in the first sub-chamber of the housing, and being compressed between the first end of the housing and the diaphragm, with the compression spring having a compression force sufficient to balance the differential pressures between the first and second sub-chambers so that the diaphragm will be positioned at its unrestricted position when the air filter is unrestricted, and so that the diaphragm will be moved from the unrestricted position progressively toward the extended position in response to increases in the restriction of air filter;

a sensor adapted to sense the relative position of the diaphragm and responsively produce an output signal which varies continuously between a first value when the diaphragm is at its unrestricted position and a second value when the diaphragm is at its restricted position; and an output terminal connected to the sensor means and being adapted to deliver the output signal to an external device; and wherein the sensor comprises a potentiometer which comprises:

a stationary portion fixed in the housing internal chamber relative to the diaphragm, the stationary portion comprising:

a strip of resistive material connected between a first and a second potential;

a conductive strip aligned adjacent the resistive strip; and a wiper member connected with the diaphragm for movement relative to the stationary portion, the wiper member forming a short circuit between the resistive strip and the conductive strip.

2. An improved air filter restriction indicating device comprising:

a housing having a first end, a second end, and a side wall defining a generally cylindrical overall chamber in the housing;

a flexible diaphragm disposed within the housing, with the diaphragm having a central portion and having an edge portion secured to the housing so that the diaphragm divides the overall chamber into a first sub-chamber, adjacent to the first end of the housing, and a second sub-chamber, adjacent to the second end of the housing, and with the central portion of the diaphragm being movable between an unrestricted position wherein the diaphragm is more closely adjacent to the second end of the housing and a restricted position wherein the diaphragm is more closely adjacent to the first end of the housing;

a first passage for permitting air communication between the air flowing out of the air filter and the first sub-chamber in the housing;

a second passage through the housing for venting the second sub-chamber to the atmosphere;

a coil compression spring disposed in the first sub-chamber of the housing, and being compressed between the first end of the housing and the diaphragm, with the compression spring having a compression force sufficient to balance the differential pressures between the first and second sub-chambers so that the diaphragm will be positioned at its unrestricted position when the air filter is unrestricted, and so that the diaphragm will be moved from the unrestricted position progressively toward the extended position in response to increases in the restriction of air filter;

an indicating member that is disposed within the first chamber of the housing and that is mounted on and carried by the diaphragm, the indicating member having centrally disposed guide post defining a central bore, a first end which is closed and which extends into the first chamber in the direction of the housing first end, a second end that opens to the second chamber;

a switching circuit adapted to sense the relative position of the diaphragm and responsively produce an output signal having at least three states, each signal state corresponding to a different position of the diaphragm, the switching circuit comprising:

at least a pair of two position switches which are fixed in the housing internal chamber relative to the diaphragm and the indicating member, wherein the two position switches each include flex arms which extend into the guide post bore and wherein the flex arms of the respective switches terminate at different heights within the guide post bore; and an activation member positioned in the guide post bore for movement with the indicating member, the activation member selectively engaging the flex arms to move the switches between their two positions as the indicating member moves within the inner chamber; and an output terminal connected to the switching circuit and being adapted to deliver the output signal to an external device.

3. The improved air filter restriction indicating device of claim 2, wherein both switches are normally closed when the diaphragm is at its unrestricted position, wherein one of the switches is open and the other is closed when the diaphragm is at a position intermediate to its unrestricted and restricted positions, and wherein both switches are open when the diaphragm is at its restricted position.

4. The improved air filter restriction indicating device of claim 1, wherein the first passage is adapted to serve as vacuum port and the second passage is adapted to serve as a positive pressure port for permitting the indicating device to measure differential pressure drop across the filter by connecting the positive pressure port upstream of the filter and by connecting the vacuum port at a location downstream from the filter.

5. The improved air filter restriction indicating device of claim 1 wherein the housing sidewall includes a transparent portion through which at least a portion of the indicating member is visible as the diaphragm moves between its reset position and its extended position.

6. The improved air filter restriction indicating device of claim 1 further comprising a centrally disposed tubular hub portion mounted on the first end of the housing and projecting into the first chamber toward the second end of the housing, and wherein the closed end of the guide post projects into and is slidable within the tubular hub portion as the diaphragm moves between its first and second positions.

7. The improved air filter indicating device of claim 6, further comprising a mounting bracket projecting from the first end of the housing, the mounting bracket being defining a recess which is collinear with the tubular hub and wherein the closed end of the cylindrical rod extends into the recess when the diaphragm is in its extended position.

8. The improved air filter restriction indicating device of claim 2, wherein the first passage is adapted to serve as vacuum port and the second passage is adapted to serve as a positive pressure port for permitting the indicating device to measure differential pressure drop across the filter by connecting the positive pressure port upstream of the filter and by connecting the vacuum port at a location downstream from the filter.

9. The improved air filter indicating device of claim 2, wherein the housing comprises an upper portion and base cap which are separately formed and are connected during assembly, the base cap and upper portion defining the internal chamber, the base cap including mounting bracket which extends into the internal chamber, and wherein the two position switches are mounted on a support plate which is adapted to be secured to the mounting bracket during assembly of the indicating device.

10. The improved air filter indicating device of claim 9, wherein the support plate comprises a printed circuit board.

11. The improved air filter indicating device of claim 1, wherein the housing comprises an upper portion and base cap which are separately formed and are connected during assembly, the base cap and upper portion defining the internal chamber, the base cap including mounting bracket which extends into the internal chamber, and wherein the potentiometer is mounted on a support plate which is adapted to be secured to the mounting bracket during assembly of the indicating device.

12. The improved air filter indicating device of claim 11, wherein the support plate comprises a printed circuit board.

* * * * *